US011204940B2

(12) United States Patent
Upton

(10) Patent No.: US 11,204,940 B2
(45) Date of Patent: Dec. 21, 2021

(54) DATA REPLICATION CONFLICT PROCESSING AFTER STRUCTURAL CHANGES TO A DATABASE

(71) Applicant: INTERNATIONAL BUSINESS MACHINES CORPORATION, Armonk, NY (US)

(72) Inventor: Gregg A. Upton, Santa Clara, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 181 days.

(21) Appl. No.: 16/193,776

(22) Filed: Nov. 16, 2018

(65) Prior Publication Data
US 2020/0159850 A1 May 21, 2020

(51) Int. Cl.
G06F 16/27 (2019.01)
G06F 16/23 (2019.01)

(52) U.S. Cl.
CPC .......... *G06F 16/27* (2019.01); *G06F 16/2365* (2019.01)

(58) Field of Classification Search
CPC .............................. G06F 16/27; G06F 16/2365
USPC ........................................................ 707/624
See application file for complete search history.

(56) References Cited

U.S. PATENT DOCUMENTS

| 4,751,702 | A | | 6/1988 | Beier et al. |
| 5,355,477 | A | | 10/1994 | Strickland et al. |
| 5,640,561 | A | | 6/1997 | Satoh et al. |
| 5,710,920 | A | * | 1/1998 | Maruyama ............ G06F 16/289 717/108 |
| 5,970,502 | A | * | 10/1999 | Salkewicz ............. G06F 16/275 |
| 6,058,401 | A | * | 5/2000 | Stamos ............... G06F 11/2035 |
| 6,345,243 | B1 | * | 2/2002 | Clark ...................... G06F 40/47 704/2 |
| 6,345,244 | B1 | * | 2/2002 | Clark ...................... G06F 40/47 704/2 |
| 6,418,443 | B1 | * | 7/2002 | Martin, Jr. ............ G06F 16/282 |
| 6,615,223 | B1 | * | 9/2003 | Shih ........................ G06F 16/27 707/625 |
| 6,915,287 | B1 | * | 7/2005 | Felsted ................. G06F 16/289 |

(Continued)

OTHER PUBLICATIONS

Gregg Upton, "Release notes for IBM InfoSphere® Data Replication for IMS forz/OS, Version 11.3", IBM Knowledge Center. Retrieved from Internet URL: <https://www.ibm.com/support/knowledgecenter/SS4T2J_11.3.0/com.IBM.swg.im.iis.clz.imsr.rel.info.doc/topics/iiyrni2irelnotes_v11r3.html>, 16 pgs.

(Continued)

*Primary Examiner* — Phuong Thao Cao
(74) *Attorney, Agent, or Firm* — William Hartwell; Matthew M. Hulihan; Heslin Rothenberg Farley & Mesiti PC

(57) ABSTRACT

Data replication conflict processing after structural changes to a database is provided by a method that includes identifying a structural change made to a database record of a database at a target site, recognizing, based at least in part on the structural change, a conflict in a replication operation to be performed at the target site to replicate, to the target site, change data from a source site, and performing conflict processing, the conflict processing including applying one or more modifications to the change data to comport with the structural change made to the database record of the database at the target site.

17 Claims, 6 Drawing Sheets

(56) References Cited

U.S. PATENT DOCUMENTS

| | | | | |
|---|---|---|---|---|
| 6,980,988 | B1* | 12/2005 | Demers | G06F 11/2064 |
| 7,290,018 | B2* | 10/2007 | Muecklich | G06F 16/275 |
| | | | | 707/624 |
| 7,337,199 | B2 | 2/2008 | Fisher | |
| 7,496,596 | B2* | 2/2009 | Li | G06F 16/213 |
| 7,529,780 | B1* | 5/2009 | Braginsky | H04L 67/42 |
| 7,822,711 | B1* | 10/2010 | Ranade | G06F 16/10 |
| | | | | 707/622 |
| 7,991,742 | B2* | 8/2011 | Li | G06F 16/213 |
| | | | | 707/638 |
| 8,027,955 | B2* | 9/2011 | He | G06F 16/2308 |
| | | | | 707/639 |
| 8,121,978 | B2* | 2/2012 | Wiss | G06F 11/2071 |
| | | | | 707/615 |
| 8,166,101 | B2* | 4/2012 | Shah | G06F 16/284 |
| | | | | 709/203 |
| 8,380,659 | B2 | 2/2013 | Zunger | |
| 8,612,405 | B1* | 12/2013 | van Rotterdam | G06F 16/219 |
| | | | | 707/695 |
| 9,395,918 | B2 | 7/2016 | Ho et al. | |
| 9,659,077 | B2* | 5/2017 | Chen | G06F 11/1451 |
| 9,690,838 | B2* | 6/2017 | Rajbhandari | G06F 16/27 |
| 10,216,820 | B1 | 2/2019 | Holenstein | G06F 16/1865 |
| 10,740,286 | B1* | 8/2020 | Gilderman | G06F 9/5038 |
| 10,803,031 | B1* | 10/2020 | Wilton | G06F 16/258 |
| 2003/0053475 | A1* | 3/2003 | Veeraraghavan | H04L 47/34 |
| | | | | 370/431 |
| 2003/0140308 | A1* | 7/2003 | Murthy | G06F 16/284 |
| | | | | 715/234 |
| 2003/0182450 | A1* | 9/2003 | Ong | G06F 16/93 |
| | | | | 709/246 |
| 2004/0044755 | A1* | 3/2004 | Chipman | H04L 29/06 |
| | | | | 709/223 |
| 2004/0098425 | A1* | 5/2004 | Wiss | G06F 16/275 |
| 2004/0122870 | A1* | 6/2004 | Park | G06F 16/27 |
| 2004/0133591 | A1* | 7/2004 | Holenstein | G06F 11/2079 |
| 2004/0139083 | A1* | 7/2004 | Hahn | G06F 16/27 |
| 2005/0204055 | A1* | 9/2005 | Martinez | G06F 9/541 |
| | | | | 709/232 |
| 2006/0136471 | A1* | 6/2006 | Ge | G06F 16/213 |
| 2006/0190497 | A1* | 8/2006 | Inturi | G06F 16/213 |
| 2006/0222161 | A1* | 10/2006 | Bank | G06F 16/275 |
| | | | | 379/221.08 |
| 2006/0294120 | A1* | 12/2006 | Li | G06F 16/213 |
| 2007/0179939 | A1* | 8/2007 | O'Neil | G06F 16/252 |
| 2008/0022057 | A1* | 1/2008 | Shah | G06F 16/2308 |
| | | | | 711/162 |
| 2008/0077632 | A1* | 3/2008 | Tysowski | H04L 67/1095 |
| 2008/0147704 | A1* | 6/2008 | Godwin | G06F 16/22 |
| 2009/0037769 | A1* | 2/2009 | Babkin | G06F 16/211 |
| | | | | 714/15 |
| 2009/0292740 | A1* | 11/2009 | Bose | G06F 16/27 |
| 2010/0106744 | A1* | 4/2010 | Wang | G06F 16/2336 |
| | | | | 707/783 |
| 2010/0332510 | A1* | 12/2010 | Gitai | G06F 16/211 |
| | | | | 707/759 |
| 2011/0078113 | A1* | 3/2011 | Franz | G06F 16/273 |
| | | | | 707/634 |
| 2011/0145187 | A1* | 6/2011 | Himmelsbach | G06F 16/2308 |
| | | | | 707/610 |
| 2011/0173619 | A1* | 7/2011 | Fish | G06F 16/2365 |
| | | | | 718/101 |
| 2012/0150829 | A1* | 6/2012 | Bourbonnais | G06F 16/273 |
| | | | | 707/703 |
| 2012/0158655 | A1 | 6/2012 | Dove et al. | |
| 2012/0191650 | A1* | 7/2012 | Ahmed | G06F 16/213 |
| | | | | 707/624 |
| 2012/0311003 | A1* | 12/2012 | Kuznetsov | G06F 16/183 |
| | | | | 707/827 |
| 2013/0066832 | A1* | 3/2013 | Sheehan | G06Q 10/00 |
| | | | | 707/634 |
| 2013/0304700 | A1* | 11/2013 | Nicklin | G06F 16/27 |
| | | | | 707/624 |
| 2014/0032501 | A1* | 1/2014 | Dulaney | G06F 16/219 |
| | | | | 707/661 |
| 2014/0101099 | A1* | 4/2014 | Driesen | G06F 16/273 |
| | | | | 707/610 |
| 2014/0372374 | A1* | 12/2014 | Bourbonnais | G06F 16/27 |
| | | | | 707/613 |
| 2014/0379636 | A1* | 12/2014 | Lober | G06F 16/211 |
| | | | | 707/610 |
| 2015/0095283 | A1* | 4/2015 | Kristoffersen | G06Q 10/06 |
| | | | | 707/624 |
| 2015/0261824 | A1* | 9/2015 | Jha | G06F 16/951 |
| | | | | 707/690 |
| 2015/0324579 | A1* | 11/2015 | Qian | H04L 63/083 |
| | | | | 726/6 |
| 2015/0378972 | A1* | 12/2015 | Kapadia | G06F 40/197 |
| | | | | 715/229 |
| 2016/0019228 | A1* | 1/2016 | Hong | G06F 16/9024 |
| | | | | 707/624 |
| 2016/0028806 | A1* | 1/2016 | Wareing | H04L 67/1021 |
| | | | | 709/217 |
| 2016/0034433 | A1* | 2/2016 | Yamat | G06F 40/194 |
| | | | | 715/229 |
| 2016/0179841 | A1* | 6/2016 | Ford | G01C 21/387 |
| | | | | 701/532 |
| 2016/0275159 | A1* | 9/2016 | Jarvie | G06F 16/1794 |
| 2016/0321225 | A1* | 11/2016 | Keslin | G06Q 10/101 |
| 2017/0177690 | A1* | 6/2017 | Ritter | G06F 16/2365 |
| 2017/0308602 | A1* | 10/2017 | Raghunathan | G06F 16/273 |
| 2017/0337254 | A1* | 11/2017 | Rajbhandari | H04L 67/1095 |
| 2017/0351744 | A1* | 12/2017 | Refael | G06F 16/273 |
| 2017/0357686 | A1* | 12/2017 | Gilligan | G06F 11/3006 |
| 2018/0095952 | A1* | 4/2018 | Rehal | G06F 16/213 |
| 2018/0096001 | A1* | 4/2018 | Soza | G06F 16/235 |
| 2018/0096043 | A1* | 4/2018 | Ledbetter | G06F 16/27 |
| 2018/0210880 | A1* | 7/2018 | Thomas | G06F 16/258 |
| 2018/0210891 | A1* | 7/2018 | Oliver | G06F 16/22 |
| 2019/0018865 | A1* | 1/2019 | Ivanov | G06F 16/258 |
| 2019/0197174 | A1* | 6/2019 | Kim | G06F 16/2433 |
| 2019/0251198 | A1* | 8/2019 | Shamsutdinov | G06F 21/602 |
| 2019/0303470 | A1* | 10/2019 | Lee | G06F 16/2282 |
| 2019/0340166 | A1* | 11/2019 | Raman | H04L 41/5009 |
| 2020/0073763 | A1* | 3/2020 | Saini | G06F 16/2365 |

OTHER PUBLICATIONS

Gregg Upton, "Setting up and managing a site transition replication environment", IBM Knowledge Center. Retrieved from Internet URL: <https://www.IBM.com/support/knowledgecenter/SS4T2J_11.3.0/com.IBM.swg.im.iis.clz.imsr.overview.doc/topics/iiyitoisitetranovu.html>, 4pgs, Access date Nov. 5, 2018.

Gregg Upton, "Phase 1—Transition to the stand-in site", IBM Knowledge Center. Retrieved from Internet URL: <https://www.ibm.com/support/knowledgecenter/SS4T2J_11.3.0/com.IBM.swg.im.iis.clz.imsr.overview.doc/topics/iiyitoisitetrans1.html>, 3 pgs, Access date Nov. 5, 2018.

Gregg Upton, "Phase II—Main site upgrade", IBM Knowledge Center. Retrieved from Internet URL: <https://www.ibm.com/support/knowledgecenter/SS4T2J_11.3.0/com.ibm.swg.im.iis.clz.imsr.overview.doc/topics/iiyitoisitetrans2.html>, 4 pgs, Access date Nov. 5, 2018.

Gregg Upton, "Phase III—Starting the transition back to the main site", IBM Knowledge Center. Retrieved from Internet URL: <https://www.ibm.com/support/knowledgecenter/SS4T2J_11.3.0/com.IBM.swg.im.iis.clz.imsr.overview.doc/topics/iiyitoisitetrans3.html>, 3 pgs, Access date Nov. 5, 2018.

Gregg Upton, "Phase IV—Main site activation", IBM Knowledge Center. Retrieved from Internet URL: <https://www.ibm.com/support/knowledgecenter/SS4T2J_11.3.0/com.IBM.swg.im.iis.clz.imsr.overview.doc/topics/iiyitoisitetrans4.html>, 4 pgs, Access date Nov. 5, 2013.

Gregg Upton, "Phase V—Upgrading the stand-in site", IBM Knowledge Center. Retrieved from Internet URL: <https://www.ibm.com/support/knowledgecenter/SS4T2J_11.3.0/com.IBM.swg.im.iis.clz.imsr.overview.doc/topics/iiyitoisitetrans5.html>, 4 pgs, Access date Nov. 5, 2018.

(56) References Cited

OTHER PUBLICATIONS

Gregg Upton, "Resilience during the upgrade process", IBM Knowledge Center. Retrieved from Internet URL: <https://www.ibm.com/support/knowledgecenter/SS4T2J_11.3.0/com.ibm.swg.im.iis.clz.imsr.overview.doc/topics/iiyitoisitetrans6.html>, 3 pgs, Access date Nov. 5, 2018.

Gregg Upton, "Types of structural changes supported by IMS replication", IBM Knowledge Center. Retrieved from Internet URL: <https://www.ibm.com/support/knowledgecenter/SS4T2J_11.3.0/com.ibm.swg.im.iis.clz.imsr.overview.doc/topics/iiyitoistructchgovu.html>, 4 pgs, Access date Nov. 5, 2018.

Gregg Upton, "Adding leaf segments", IBM Knowledge Center. Retrieved from Internet URL: <https://www.ibm.com/support/knowledgecenter/SS4T2J_11.3.0/com.ibm.swg.im.iis.clz.imsr.overview.doc/topics/iiyitoiaddleaf.html>, 4 pgs, Access date Nov. 7, 2018.

Gregg Upton, "Increasing the length of an existing segment", IBM Knowledge Center. Retrieved from Internet URL: <https://www.ibm.com/support/knowledgecenter/SS4T2J_11.3.0/com.ibm.swg.im.iis.clz.imsr.overview.doc/topics/iyitoigrowsegment.html>, 5 pgs, Access date Nov. 7, 2018.

Gregg Upton, "Deleting segments from the hierarchy", IBM Knowledge Center. Retrieved from Internet URL: <https://www.ibm.com/support/knowledgecenter/SS4T2J_11.3.0/com.IBM.swg.im.iis.clz.imsr.overview.doc/topics/iyitoidelsegment.html>, 5 pgs, Access date Nov. 7, 2018.

Gregg Upton, "Change management sample exit", IBM Knowledge Center. Retrieved from Internet URL: <https://www.ibm.com/support/knowledgecenter/SS4T2J_11.3.0/com.ibm.swg.im.iis.clz.imsr.overview.doc/topics/iiyitoichgmgsampleexit.html>, 4 pgs, Access date Nov. 7, 2018.

Gregg Upton, "Configuring the target server to support structural changes", IBM Knowledge Center. Retrieved from Internet URL: <https://www.ibm.com/support/knowledgecenter/SS4T2J_11.3.0/com.IBM.swg.im.iis.clz.imsr.overview.doc/topics/iiyitoicfgtgtstructchg.html>, 4 pgs, Access date Nov. 7, 2018.

Mohan, C., et al., "Algorithms for the management of remote backup data bases for disaster recovery," Proceedings of IEEE 9th International Conference on Data Engineering, 1993, pp. 511-518.

"Overview of IMS Replication", IBM. Retrieved from Internet URL <https://www.ibm.com/support/knowledgecenter/en/SS4T2J_11.3.0/com.IBM.swg.im.iis.clz.imsr.overview.doc/topics/iiyitoioverview.html>, 7 pgs, Access date Nov. 7, 2018.

Mell, Peter, et al., "The NIST Definition of Cloud Computing", NIST Special Publication 800-145, Sep. 2011, Gaithersburg, MD, 7 pgs.

* cited by examiner

DATA REPLICATION CONFLICT PROCESSING AFTER STRUCTURAL CHANGES TO A DATABASE

STATEMENT REGARDING PRIOR DISCLOSURES BY THE INVENTOR OR A JOINT INVENTOR

The following disclosure(s) are submitted under 35 U.S.C. 102(b)(1)(A):

Gregg Upton, "Setting up and managing a site transition replication environment", IBM Knowledge Center, available at ibm.com (first published Jan. 31, 2018);

Gregg Upton, "Phase I—Transitions to the stand-in site", IBM Knowledge Center, available at ibm.com (first published Jan. 31, 2018);

Gregg Upton, "Phase II—Main site upgrade", IBM Knowledge Center, available at ibm.com (first published Jan. 31, 2018);

Gregg Upton, "Phase III—Starting the transition back to the main site", IBM Knowledge Center, available at ibm.com (first published Jan. 31, 2018);

Gregg Upton, "Phase IV—Main site activation", IBM Knowledge Center, available at ibm.com (first published Jan. 31, 2018);

Gregg Upton, "Phase V—Upgrading the stand-in site", IBM Knowledge Center, available at ibm.com (first published Jan. 31, 2018);

Gregg Upton, "Resilience during the upgrade process", IBM Knowledge Center, available at ibm.com (first published Jan. 31, 2018);

Gregg Upton, "Types of structural changes supported by IMS Replication", IBM Knowledge Center, available at ibm.com (first published Jan. 31, 2018);

Gregg Upton, "Adding leaf segments", IBM Knowledge Center, available at ibm.com (first published Jan. 31, 2018);

Gregg Upton, "Increasing the length of an existing segment", IBM Knowledge Center, available at ibm.com (first published Jan. 31, 2018);

Gregg Upton, "Deleting segments from the hierarchy", IBM Knowledge Center, available at ibm.com (first published Jan. 31, 2018);

Gregg Upton, "Configuring the target server to support structural changes", IBM Knowledge Center, available at ibm.com (first published Jan. 31, 2018);

Gregg Upton, "Change management sample exit", IBM Knowledge Center, available at ibm.com (first published Jan. 31, 2018);

Gregg Upton, "Release notes for IBM InfoSphere® Data Replication for IMS for z/OS, Version 11.3", IBM Knowledge Center, available at ibm.com (first published Jan. 31, 2018).

BACKGROUND

Large corporations run significant portions of their systems on ecosystems that store data to various types of databases, such as relational and non-relational databases. Example non-relational database systems include the IBM Information Management System (IMS) and the IBM Virtual Storage Access Method (VSAM), both offered by International Business Machines Corporation, Armonk, N.Y., USA. Operational system requirements typically mandate near-continuous availability, however the rate of change to stay competitive and/or compliant can necessitate relatively frequent changes to the databases/files where the operational data is stored. The data stores tend to be extremely large due to the scale of these operations. Consequently, when there is a need or desire to change these databases, for instance to add additional information, the process can take time and render the applications that access this data temporarily inoperable.

Unlike with relational database architectures, applications that access/update IMS data typically have visibility to all of the data in an IMS database record (a "segment" in IMS terminology). Similarly, applications that access/update VSAM data see the entire contents of the database record ("record" in VSAM terminology) stored in the file. In order to add more data to an existing IMS segment or VSAM record, i.e. to increase the length of the segment/record, the database/file is usually unloaded, updated, and then reloaded after the database/file has been updated. The reload may be done using a custom application that formats the new data, or possibly a vendor-supplied utility, depending on the change being made.

Changes other than or in addition to changing the size of an existing segment can be made in the case of an IMS database. An example change may be to add new child segment(s) to the database. It is also possible to delete an existing segment and/or change existing parent child relationships.

The applications that access this data cannot operate when the database/file is being unloaded, changed, and reloaded. This operation can take a considerable amount of time depending on the size of the database/file being changed. Generally, enterprise applications have a zero down-time goal, though that is not always achieved. There are more realistically short periods of scheduled down-time that can range from a few minutes to an hour or two. The (negative) extent of the impact to the business is directly proportional to the amount of time that the application is unavailable. A desire to provide almost continuous availability makes the database/file change process inherently risky since there are multiple operations that are to be executed in a proper sequence for this process to be successful.

SUMMARY

Shortcomings of the prior art are overcome and additional advantages are provided through the provision of a computer-implemented method. The method identifies a structural change made to a database record of a database at a target site. The method recognizes, based at least in part on the structural change, a conflict in a replication operation to be performed at the target site to replicate, to the target site, change data from a source site. The method also performs conflict processing. The conflict processing includes applying modification(s) to the change data to comport with the structural change made to the database record of the database at the target site. This process has an advantage in that it provides approaches to reduce application unavailability when making database/file structural changes, by utilizing a software replication conflict exit deployed in an active/standby configuration.

Further, a computer system is provided that includes a memory and a processor in communication with the memory. The computer system is configured to perform a method. The method identifies a structural change made to a database record of a database at a target site. The method recognizes, based at least in part on the structural change, a conflict in a replication operation to be performed at the target site to replicate, to the target site, change data from a source site. The method also performs conflict processing.

The conflict processing includes applying modification(s) to the change data to comport with the structural change made to the database record of the database at the target site.

Yet further, a computer program product including a computer readable storage medium readable by a processing circuit and storing instructions for execution by the processing circuit is provided for performing a method. The method identifies a structural change made to a database record of a database at a target site. The method recognizes, based at least in part on the structural change, a conflict in a replication operation to be performed at the target site to replicate, to the target site, change data from a source site. The method also performs conflict processing. The conflict processing includes applying modification(s) to the change data to comport with the structural change made to the database record of the database at the target site.

Additional features and advantages are realized through the concepts described herein.

In some embodiments, the database is a non-relational database. This has an advantage in that it provides a way to gracefully handle cases where structural changes are made to records of the non-relational database, without significant downtime or critical data replication errors.

The structural change can include a change in a length of the database record, for instance to increase the length of the record. Supporting such a structural change has an advantage in that database records can be increased (or decreased) in length as desired, and the resulting data replication conflicts are handled automatically.

In embodiments, the replication operation is (i) an insert of the change data or (ii) an update, using the change data, of current data image data of the database record. This has an advantage in that both inserts and updates are handled by the process, to enable these types of data replication operations despite the structural change to the target.

In particular examples, the process also includes unloading the database, performing the structural change to the database record, and reloading the database. The identifying the structural change can be performed based on reloading the database. Thus, the process can also include providing an indication of the structural change in metadata about the database, where the identifying the structural change is based on the provided indication. This has an advantage in that identifying when structural changes occurred enables the conflict processing to be called accordingly.

Applying the modification(s) can include, for instance, applying custom formatting to the change data to produce a result, and the process can write the result into the structurally-change database record. Applying custom formatting has an advantage in that it enables the conflict to be resolved by properly formatting the change data for the implemented database change at the target, thereby resolving the conflict.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are approaches for conflict processing, for instance to resolve conflicts arising during a data replication process to replicate database changes from a source to a target. Although examples are presented with reference to, and using terminology of, the IMS and VSAM database systems offered by International Business Machines Corporation, aspects are equally applicable to other database systems.

Conflict processing (implemented by a 'conflict exit' for example) in accordance with aspects described herein can support replication processes even after structural changes have been made to database records at the target receiving the replication changes. This is the case even though the changes to be replicated from the source were made against records having a different (i.e. pre-structural change) record structure. Example database/file change processing is performed by a data replication solution operating in an active/standby environment.

An active/standby deployment that utilizes software data replication during the transition process to the stand-in/standby site and upon return to the main/active site can reduce application unavailability time and make the change process less risky. After operations have completed the transition to the standby site, the main site databases can be upgraded. Once the upgrade is complete, and during the transition of operations back to the main site, the application workload-provided changes made to the database at the standby site are integrated with the new layout of the target database, for instance using a custom-developed conflict handling exit implemented by the organization and supported by the data replication software.

Figure 1:
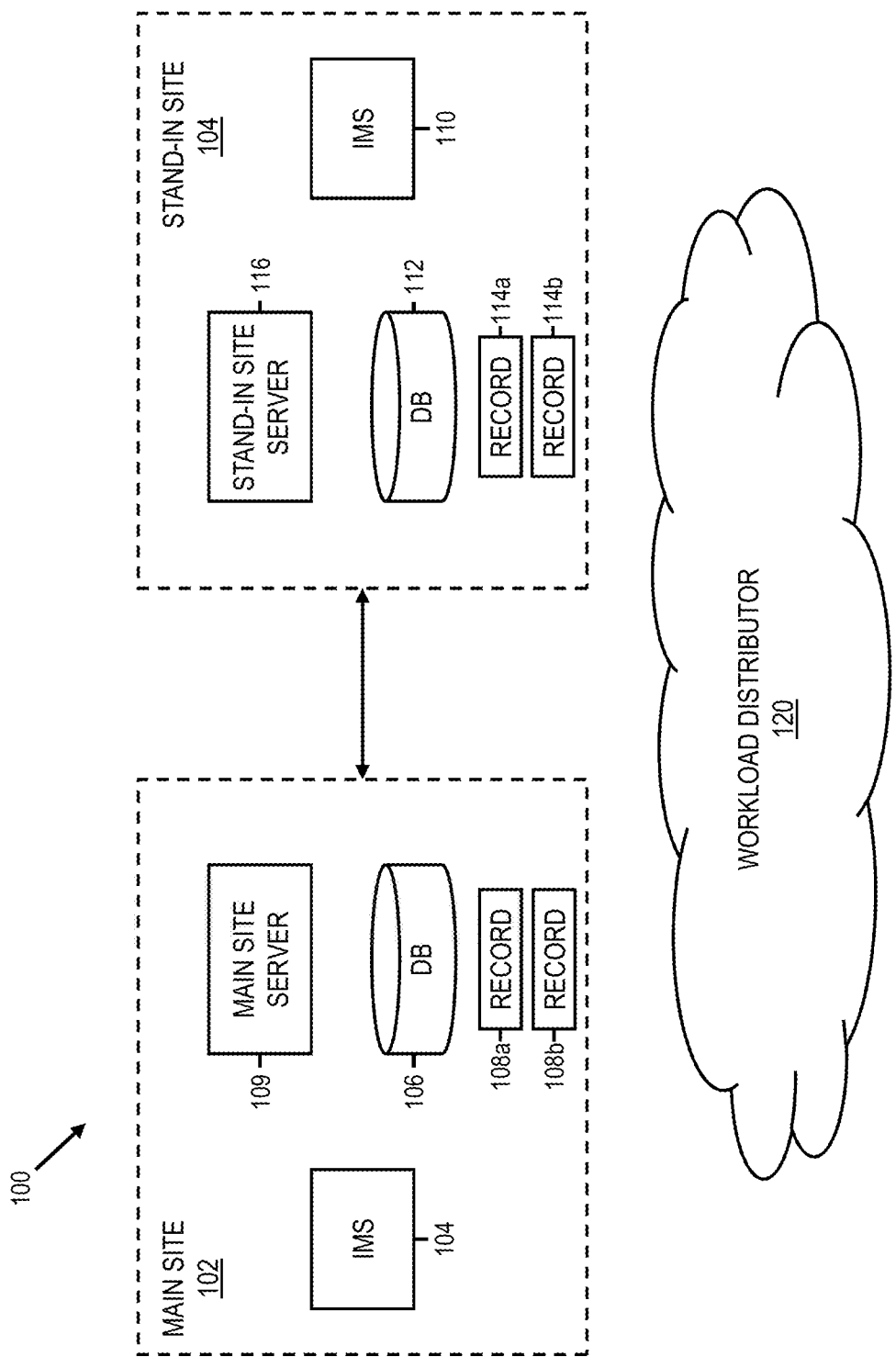
FIG. 1 depicts an example environment to incorporate and use aspects described herein.

FIG. 1 depicts an example environment to incorporate and use aspects described herein. The environment 100 is a site transition replication environment, in which a main site 102 and stand-in (or "standby") site 104 are located remote from each other and are in communication across one or more networks, represented by the double-sided arrow between the two sites in FIG. 1. The main site 102 includes an IMS subsystem 104 for IMS database 106, i.e. a non-relational database having database records ("segments") 108a, 108b that are stored within the database container/structure 106. Main site server 109 is a server (hardware and/or software) that executes data replication (DR) software to replicate changes made to the main site database records over to the stand-in site and vice versa. DR software can support 'conflict exit' processing, in which processing is called to resolve an apparent conflict during an apply process to apply changes made to one site database to a database at another site.

Stand-in site 104 also includes an IMS subsystem 110 for IMS database 112 having segments 114a, 114b that are stored within the database container/structure 112. Stand-in site server 116 is a server (hardware and/or software) that executes data replication (DR) software used in the replication of changes made to the main site database records over to the stand-in site and vice versa.

Workload distributor 120 is responsible for distributing workload (for instance workload of applications) to the sites 102, 104. Main site 102 is termed as such since it is the main site to which workload is directed. Workload can effect desired deletions, inserts, and changes/updates to data in the database. In an IMS environment such as this, applications may not directly access the database (106) but rather use, e.g., IMS API calls that are routed through the IMS software 104 that is responsible for updating the actual database 106. Changes applied to the database 106 at the main site can be replicated to the stand-in site in case of a failover or other situation. Thus, incoming workload is typically routed to the main site 102 where the IMS replication source server 103 is running. As changes are made to source database 106, they are replicated via servers 109 and 116 to the stand-in site 104, where the changes are applied to the target database 112. During regular, ongoing workload handling, the source and target IMS databases are initially structurally identical. However, it may be desired to upgrade the main IMS database 106 to make structural changes thereto. In this situation, the stand-in site 104 stands-in for the main 102 while the change(s) are made to the main site database. Thus, a transition to the stand-in site is effected, the main site is upgraded, and then a transition is made back to the main site.

In this scenario, there are two brief application outages. The first is on the transition to the standby site 104. The applications driving the workload are quiesced at the main site 102 and, once the latest updates are replicated to the standby site 104, the applications become available again with traffic now being routed (by the workflow distributor 120) to the standby site 104.

The second application outage is on the transition back to the main site 102. Data replication has applied changes, made at the standby site 104, to the upgraded database(s) at the main site 102, and the applications are again quiesced, this time at the standby site. After quiescing and once the latest changes made at the standby site 104 are replicated back to the main site 102, the workload distributor again routes traffic to the main site 102.

Conflict processing, such as a "conflict exit", can be called in the data replication process to resolve inconsistencies found between the source and target databases during change apply processing. In some examples, a conflict exit is called only when there is a difference/inconsistency detected for a specific change operation.

In accordance with aspects described herein, custom conflict processing is provided and used in cases where structural changes are made to database records at a target (e.g. main) site that is to receive updates from a source (e.g. stand-in) site having the initial structure of the database records. The conflict processing can modify segment/file contents of changes made at a source (e.g. a standby) site to match upgraded database/files layout at a target (e.g. the main) site. The custom processing can be applied assuming that the data replication product supports the use of conflict processing to resolve inconsistencies found between the source and target databases during the apply process and allows the source/target database/files layouts to be different. When the conflict processing is enabled (e.g. 'installed'), the conflict processing can be called to resolve the 'inconsistency' for any operation to apply a change to a database record that has been structurally changed at the target.

Thus, described aspects use a conflict exit in situations where the source database record structure is different from the target database record structure as reflected by the change data passed from the source to the target. The 'source' can refer to the standby site to which workload had been temporarily routed and therefore data inserts, updates, etc. are being made to the database at the source, though changes could flow from any desired source site. The target refers in example presented herein to the main site away from which the workload has been temporarily redirected to the standby site, though changes could flow to any desired target site. Database record(s) at the target (main site) undergo desired structural change(s). An example structural change is a change in the size of a database record (e.g. IMS segment and/or VSAM record), for instance to increase the size of the database record. After the structural change(s) are made, the workload is again to be directed to the main site.

Structural changes made to the application database/files in examples described herein include increasing the length of a segment/record. However, aspects enable more radical changes, such data reformatting, to be supported in situations where the data replication product allows the conflict exit to be called on the relevant change operations, e.g., insert operations.

With these approaches, the main site systems can be taken offline once the workload has transferred to the standby site. At that point, the database (and any applicable application) upgrade process can begin at the main site. This process can take as long as necessary, with the main site systems being brought back up once the upgrade process is complete. At that point, catch-up processing can begin. The changes that were made at the standby site (the "source") via workload requests start to flow to the main site (the "target") via the DR processing. At the target/main site, conflict processing receives control at the appropriate times, for instance when during a change operation a mismatch is detected between the structure of the change data (from the source) and the database record at the target. The conflict processing performs the appropriate structural transformation(s), etc. on the change data in order to for that data to be stored into the upgraded main site databases/files (database records).

In particular embodiments, an expectation is that replication runs long enough to take the changes made at the source/standby site (to database records with the initial structural format) and apply them using a custom conflict exit to the database at the target/main site, and more specifically to database records that were changed from the initial structural format to the new structural format. Once the latency of the changes being applied is relatively small, say a second or two, then the organization can cease allowing changes to be made at the source site, e.g. by quiescing the applications submitting workload requests. Once the final changes have been replicated to the target site, operations are resumed (the applications are no longer quiesced) and the workload is routed to the target site with the upgraded database. After this, replication (from source to target) can be stopped, if desired.

From an application, client, or web site perspective in these scenarios, traffic is being routed to the source site until replication is caught up. The site may be disabled temporarily while the last changes are applied at the target/main site. Once that occurs, the target/main site is brought back up in the sense that a transition is made back to the target site and traffic is again routed to the target site having the structurally-changed database records, for instance of a new record length. The target/main site contains all the changes that occurred when the unload/reload was performed at the main site, and the business continues to operate with a relatively limited outage. In some situations, the organization may not have even announced the site transition, and any end users who experienced slow response time may have been inconvenienced only in that they had to retry/resubmit their request if the site did not respond immediately to their initial request.

Thus, in particular embodiments with application0 workload operating against a backup/standby (e.g. the "source") site, structural change(s) are made to database records at the target site. As part of this, the database at the target can be unloaded, the structural change(s) is/are made to database records of the unloaded database by an administrator or automatically, then the database is reloaded. Metadata describing properties of that database can indicate/identify that a structural change has been made. The metadata about the database can be refreshed/reloaded, for example, after the upgrade, such that the new version of the metadata provides an indication of the new structure and/or the structural change. This can be used to identify the structural change(s) actually made, for instance that a record was expanded in length from 80 bytes to 160 bytes. The replication software can use this metadata to identify the structural change. When the replication software starts the transition back to the main (target) site, the process can identify the difference in the metadata between the source and target, and therefore identify the structural change. The replication software can, for instance, query the metadata about database record(s) and discover that the source record structure and target record structure are not the same, and this can be used to trigger conflict processing, for instance a call to a conflict exit as described herein, at the target site.

In some scenarios, the main site version of the database/file and the standby version of the database/file being upgraded are consistent, and the only conflicts that are detected are due to the database record upgrade process at the main site, since those databases/files are offline and not then being updated by the workload-producing applications. This allows the organization to develop custom logic for the databases/files being upgraded that allows the changes made at the standby site to be properly reintegrated at the main site.

The conflict exit or other conflict processing can be configured for the replication software by setting configuration parameter(s), for instance one that identifies the name of the conflict exit and another to activate detecting and calling the exit when there are metadata conflicts, e.g. when the length of the source record is different from the length of the target record. In some examples, code for execution to perform the conflict processing is copied (installed) into a library to which the apply software, which may be part of the data replication software, has access, so that is can be loaded and called when appropriate. Thus, aspects can install, with a data replication process at the target site, a call to the conflict processing that is to be invoked based on recognizing the conflict in a replication operation. Recognition of the conflict can be based on recognizing an inconsistency between a structure (such as a length) of the change data flowing from the source and the structurally-changed database record at the target.

In cases of an active/standby environment, the standby site can be taken offline once workload transitions back to the main site. At that point, the structural changes made at the target site can also be made to the standby version of the database/files (database records) to harmonize the structure of the database at the source with that of the upgraded target.

During the period of time when the database/files have different layouts between the two sites, a transition operation between the two sites may not be possible without potentially massive data loss. However, this exposure can be mitigated using any desired approach. One such approach is to use a combination of flash copy back-ups and disk mirroring to reduce downtime in case of a disaster or major operational mistake during the upgrade process. In an example, a third site, system, logical partition, the system at the main site itself, and/or an alternative volume at the standby site, can be spawned and populated with the newest version of the database (from the main site) as a disaster recovery option.

Specific classes of conflicts that may exist between a source/target object in a replication operation between a source and target object in a replication environment include:

(a) For an insert operation, the object already exists at the target. In traditional "upsert" processing, the object at the target would be updated with the insert contents from the source.

(b) For an update operation, the object does not exist at the target. In traditional "upsert" processing, an object would be inserted at the target using the source's 'after image' data.

(c) For a delete or update operation, there is a mismatch between the contents of the source before image and what exists at the target (i.e. "before image mismatches"). In traditional "upsert" processing, the object would be deleted or updated with the source after image contents; in other words, it would ignore the fact that the discrepancy exists.

A major restructuring of the database/file database records may result in occurrences of (a) and (b) above, though the impact that these kinds of changes have on existing application logic may be drastic. Consequently, a relatively common scenario of conflict processing as described herein may be case (c)—before image mismatches. It is noted that mere expansion/contraction of a database record from one length (number of bytes) to a different length (number of bytes) itself constitutes a structural change to the database record, even if the useful/relevant data of the database record remains the same. Even if a customer phone number stored in an 80-byte record remains the same when the record is expanded to 160 bytes, this is a discrepancy that change processing will identify; the source after image data is 160 bytes which does not match the 80-byte record at the target.

From a terminology perspective, the target is where the conflict exit resides, meaning the conflict exit processing can be performed at the target where the updated database having the structurally-changed database records resides. The source is where the original database/file resides. At the time of the use of the conflict exit, the application workload can be executing at the standby site using the original database/file definitions, the main site may be operational though application workload is not running at the main site, and the database/files have gone through their upgrade process. At that point, the main site applications may be, or have been, modified to access the new versions of the database/file (i.e. the structurally changed database records), the application environment (IMS/CICS) may have been updated to reference/use the upgraded database/file, including the data replication product, and the data replication product is executing at both sites with replication possible from the standby site to the main site.

Aspects can support the relatively common type of structural change of increasing the maximum length of a segment or record, though a size change to decrease the maximum length of a segment or record is also possible. The way a length change is handled may be different depending upon whether the existing layout has a fixed or variable length and whether, as part of the upgrade process, data formatting is required for the updated applications to function properly. An initial assumption is that the data replication software is aware of the segment/record length differences between the source and target, which in some embodiments is the signal/trigger for the apply process to call the conflict exit.

Taking the case where the size of a fixed layout is increased, because the storage used by one of these segments/records is the same size as part of the upgrade process, the new data (the change data received from the source) is to be formatted with something. Often the applications have been designed to deal with new data that contains spaces or binary zeros, as one possibility. Another possibility is that, as part of the upgrade, the new data has custom formatting applied to it.

An example structural change is an increase in the size of the segment/record from 80 bytes to 160 bytes, and the new data is to be formatted with custom values. For delete and update operations, the conflict exit is driven, as the before image (at 80 bytes) and after image (at 160 bytes) cannot possibly match as indicated by the differences in the length of the data between the source and the target definitions. The conflict exit in these situations can identify what the apply process is to perform. Options include, as examples, a 'force apply' (update the target database), ignore the change, or stop replication. The conflict exit can contain logic for any custom code to transform the older (source) data into the new format. Thus, modification(s) can be applied to the change data that the source site has or will send to the target site. Applying the modification(s) can include applying custom formatting to the change data to produce a result that is written into the structurally-changed database record. In this type of example where modification(s) are made, the exit requests a force operation.

As described above, the conflict exit can be called when there is a difference/inconsistency detected and recognized for a specific operation, such as an update or insert operation. A structural change made to the database record of the database at a target site is identified. As noted, example 'database records' are "segments" of an IMS database or "records" of a VSAM database. A structural change can include a change in a length of the database record, for instance to increase its length. Recognizing that a conflict is present can include recognizing a difference in length between the change data and the database record that has been structurally changed as part of a database upgrade. A call to the conflict processing can be signaled based on recognizing that structural change when a replication operation (e.g. delete target data record, insert change data to target data record, update image data of target data record with change data) is to be performed. The conflict processing is called to resolve the 'inconsistency' for these operation(s) against a database record that has been structurally changed. As noted, the conflict exit can be driven based on observing a difference (conflict) in the metadata for the database record between the source and target, e.g. the record length is 80 bytes at the source and 160 bytes at the target. Therefore, in some instances, the particular structural change can be inferred based on what is indicated by the metadata.

The conflict exit is called, e.g. based on detecting a metadata conflict in performing a replication operation, because the source and target record links are different. For a delete operation using the example above where the length is expanded from 80 bytes to 160 bytes, the conflict exit can confirm that the first 80 bytes of the target match the source, and allow the delete to proceed. For an update, the same confirmation process can occur except then the conflict exit moves the last 80 bytes of the "new" target data into the target after image buffer. In other words, the 80-byte data is received from the source by the target and written in the first 80 bytes of the after image buffer, which is actually to be 160 bytes based on the structural change to the database record at the target from 80 to 160 bytes. The last 80 bytes of the target 'before image' (the 160-byte data of the structurally changed database record) are then written into the last 80 byes of the target after image buffer. The 'upsert' operation can then be requested. This is one example of applying modification(s) to the change data to comport with the structural change made to the database record of the database at the target site. A realistic assumption is that the conflict exit has access to the source before and after images, the current data image at the target, and can update the contents of the after image before it is applied to the target database/file.

In this situation, the conflict exit is to be called when a source insert operation is detected for an object that has been upgraded and the replication software is to be able to detect when it has an insert with only 80 bytes of data, yet the target definition says it should be 160 bytes. How the replication software decides to indicate this condition to the conflict exit may be implementation defined. When informed that the object lengths are inconsistent for an insert operation, the conflict exit can identify the object and perform any required data formatting before returning control and informing the apply logic to go ahead and insert the data at the target. Conflict processing could therefore be called relatively frequently.

The data replication software may not initially consider inconsistencies in length between the source and target as a reason to drive the conflict exit. So, while it may be possible to detect that there exists an inconsistency, it may be likely (but not a requirement) that the data replication product supports some method for an administrator, or a conflict exit, to indicate that the conflict exit should be called for insert operations when there are inconsistencies between the source/target databases/files.

Variable length segments/records may have similar behavior or requirements depending on the change and how the applications deal with variable length objects. If the upgrade just increases the maximum size of the segment/record and does not perform any preformatting, then there may be no need for a conflict exit to be involved since the source/target should be consistent. However, if the minimum length is increased and is now larger than the actual size of the source, then the conflict exit may be driven for delete/update operations because the source/target will not match structurally, and driven for inserts with the behavior described above. Likewise, if an organization decides to pre-format the new data (at the main site as part of the upgrade), then delete and update operations can drive the conflict exit, and, for updates, the conflict exit can integrate the source data with the preformatted target data using the larger target segment/record length for the update operation.

In the case of an insert operation where the actual segment/record size is greater than or equal to the minimum segment/record length but the application has preformatted new data, this condition may not be detected by the replication software. From an exit perspective, the processing to be done for insert operations may be similar to that described above for fixed length segments. Assuming that the maximum segment/record length has been increased, the replication software can treat this the same way it does for fixed length segments/records since the maximum (or minimum) length between the source and target are inconsistent.

Potentially, the database/file does not require any structural changes, the application has enough space available and just wants or needs to reuse or recondition the data. For delete and update operations, differences due to the reconditioning could be detected and the exit could re-condition the standby data for update operations before requesting the update operation proceed.

To support this kind of use case, the replication software is to become aware that the conflict exit is to be called for at least certain kinds of insert operations. This can be accomplished, as one example, by allowing the conflict exit to request this form of processing or by the replication software supporting a configuration parameter or command requesting this form of special processing. Given the custom nature of the conflict exit and the length of time is may be deployed, using a "call exit on insert" indicator may be all that is required, as opposed to an explicit identification of the objects that require this special processing. However, flexibility in this solution may be implementation-dependent. The above approach could also satisfy other use cases described above where the replication does not detect that there are inconsistencies between the source/target, or whether the difference (inconsistencies) may not warrant calling the conflict exit to resolve.

Figure 2:
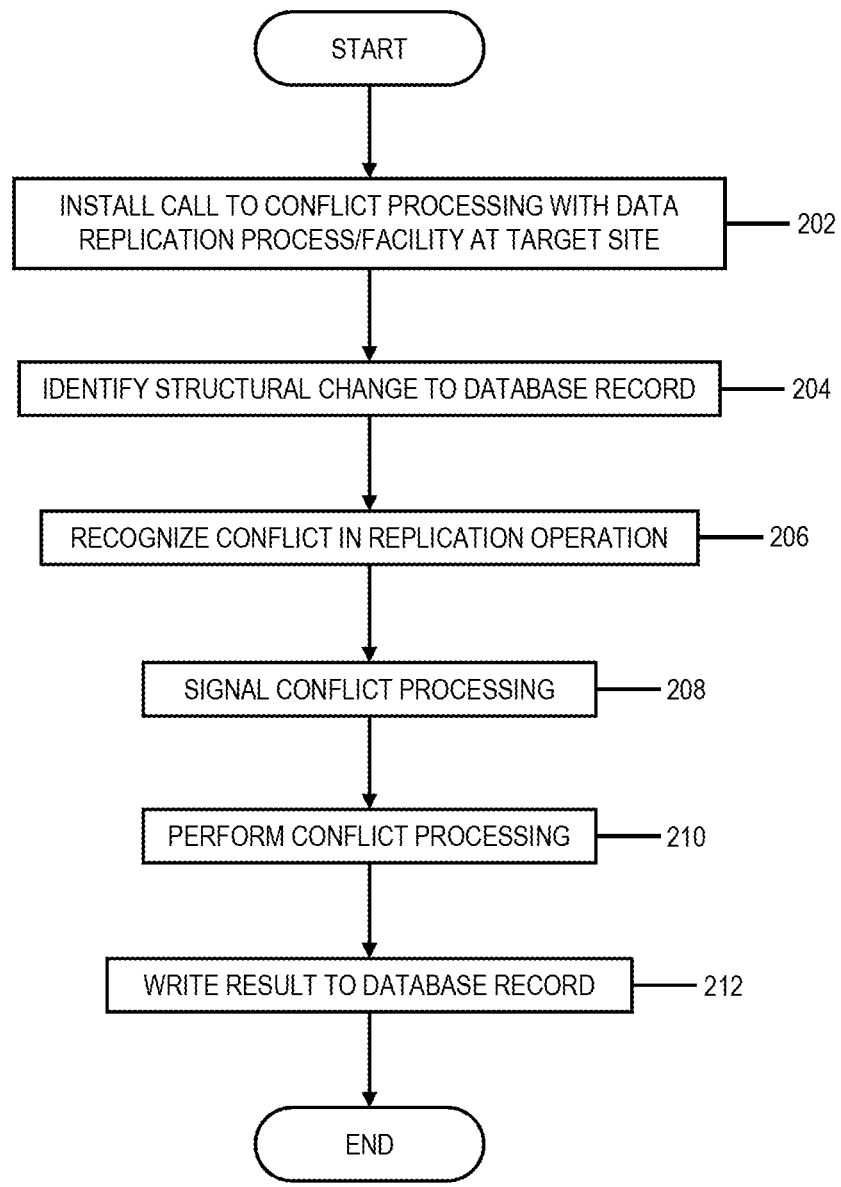
FIG. 2 depicts an example process for data replication conflict processing after a structural change to a database record, in accordance with aspects described herein.

FIG. 2 depicts an example process for data replication conflict processing after a structural change to a database record, in accordance with aspects described herein. In some examples, the process is performed by one or more computer systems, such as those described herein, which may include one or more computer systems of a target site and/or one or more other computer systems. In particular examples, the process is performed by a computer system running data replication software at the target site to facilitate data replication from the source site to the target site.

The process installs (registers and/or configures) (202), in or with a data replication process at a target site, a call to conflict processing. The call is to be invoked during replication processing based on recognizing certain conflicts in replication operations.

The process identifies (204) a structural change made to a database record of a database at the target site, and recognizes (206), based at least in part on the structural change, a conflict in a replication operation to be performed at the target site to replicate, to the target site, change data from a source site. The change data is source after image data, for instance, sent from the source site to the target site. Example replication operations include insert, update, and delete operations. The recognizing can be based on recognizing an inconsistency between a structure of the change data and the structurally-changed database record, for instance.

The process signals (208) a call to the conflict processing based on recognizing the change. The process continues by performing (210) the conflict processing, for instance by way of executing code of a called conflict exit. Performing the conflict processing can generate a result, which the process of FIG. 2 writes (212) into the structurally-changed database record.

The process of FIG. 2 has an advantage in that it provides approaches to reduce application unavailability when making database/file structural changes, by utilizing a software replication conflict exit deployed in an active/standby configuration.

In some examples, the database is a non-relational database, and the process advantageously provides a way to gracefully handle cases where structural changes are made to records of the non-relational database, without significant downtime or critical data replication errors. In particular examples, the database record is or includes a segment of the database (e.g. an IMS segment) or a VSAM record.

The structural change is, for instance, a change in a length of the database record, such as an increase in the length of the record. Supporting such a structural change has an advantage in that database records can be increased (or decreased) in length as desired, and the resulting data replication conflicts are handled automatically. Recognizing the conflict (206 of FIG. 2) can include recognizing a difference in length between the change data and the database record, and the signaling (208) can be performed based on recognizing that difference in length.

In embodiments, the replication operation is (i) an insert of the change data or (ii) an update, using the change data, of current data image data of the database record. This has an advantage in that both inserts and updates are handled by the process, to enable these types of data replication operations despite the structural change to the target.

In particular examples, the process also includes unloading the database, performing the structural change to the database record (and potentially many other records), and reloading the database. The identifying the structural change can be performed based on reloading the database and on resulting metadata about the changed database. Thus, the process can also include providing an indication of the structural change in metadata about the database, where the identifying the structural change is based on the provided indication. This has an advantage in that identifying when structural changes occurred enables the conflict processing to be called accordingly.

Figure 3:
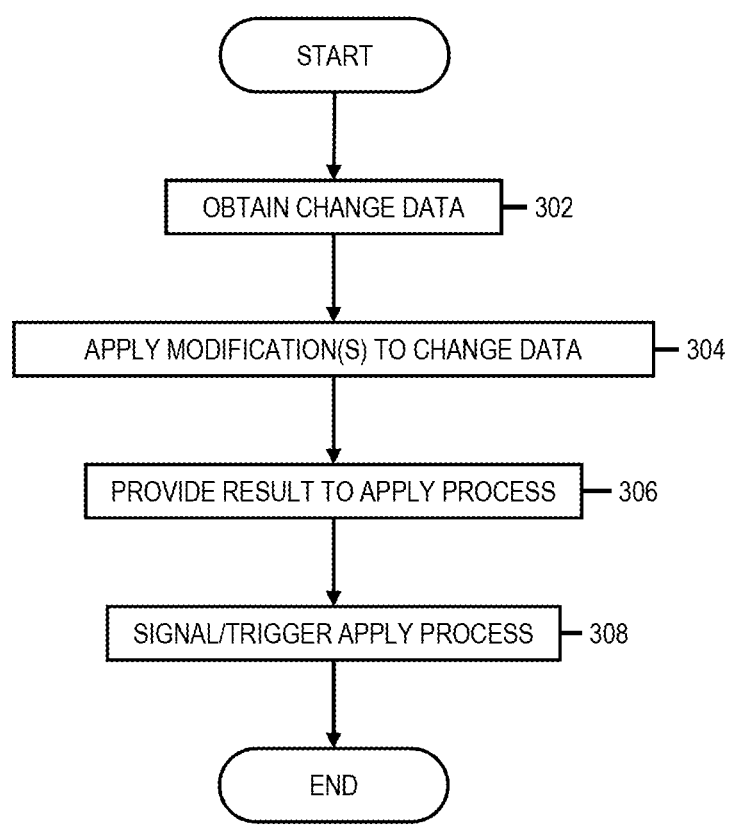
FIG. 3 depicts example conflict processing, in accordance with aspects described herein.

FIG. 3 depicts example conflict processing, in accordance with aspects described herein. The process can be performed by one or more computer systems, such as those described herein, which may include one or more computer systems of a target site and/or one or more other computer systems. In particular examples, the process is performed by the computer system(s) that performs the process of FIG. 2. The conflict processing may be a configured 'conflict exit' of data replication software.

The conflict processing obtains (302) the change data passed from the source and applies (304) one or more modifications to the change data to comport with the structural change made to the database record of the database at the target site. Applying the one or more modifications can include, for instance, applying custom formatting to the change data to produce a result. Applying custom formatting has an advantage in that it enables the conflict to be resolved by properly formatting the change data for the implemented database change at the target, thereby resolving the conflict. The conflict processing makes the changes to produce an output/result. The process provides (306) the result to the apply process, for instance writes it to a buffer, sends, or otherwise makes it available/accessible to the apply processing of the replication processing. Then the process signals/triggers (308) the apply process. In some examples, this is merely the conflict processing breaking/returning back to the calling process, perhaps passing an appropriate return value. In some examples, there is a flag or other signal issued by the signaling (308). When the apply processing resumes, it can apply the result of the conflict processing to the target image.

Although various examples are provided, variations are possible without departing from a spirit of the claimed aspects.

Figure 4:
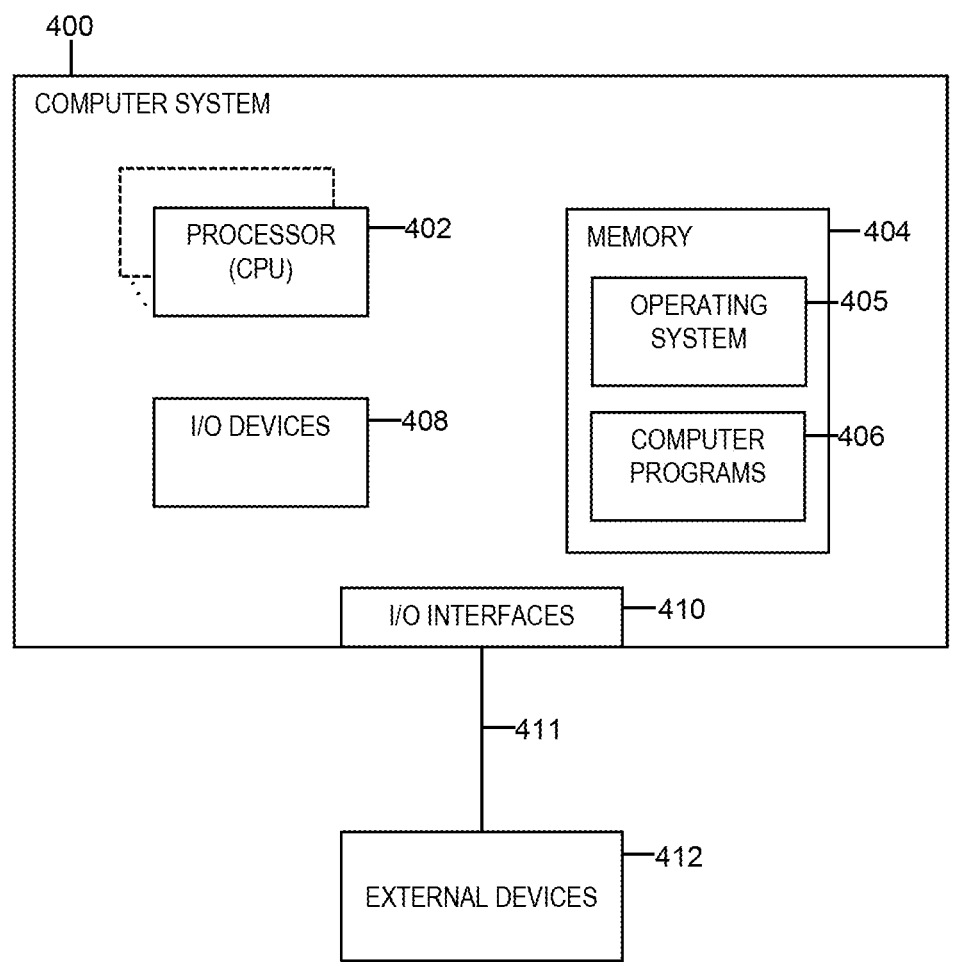
FIG. 4 depicts one example of a computer system and associated devices to incorporate and/or use aspects described herein.

Processes described herein may be performed singly or collectively by one or more computer systems, such as one or more data replication servers at a site, as an example. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
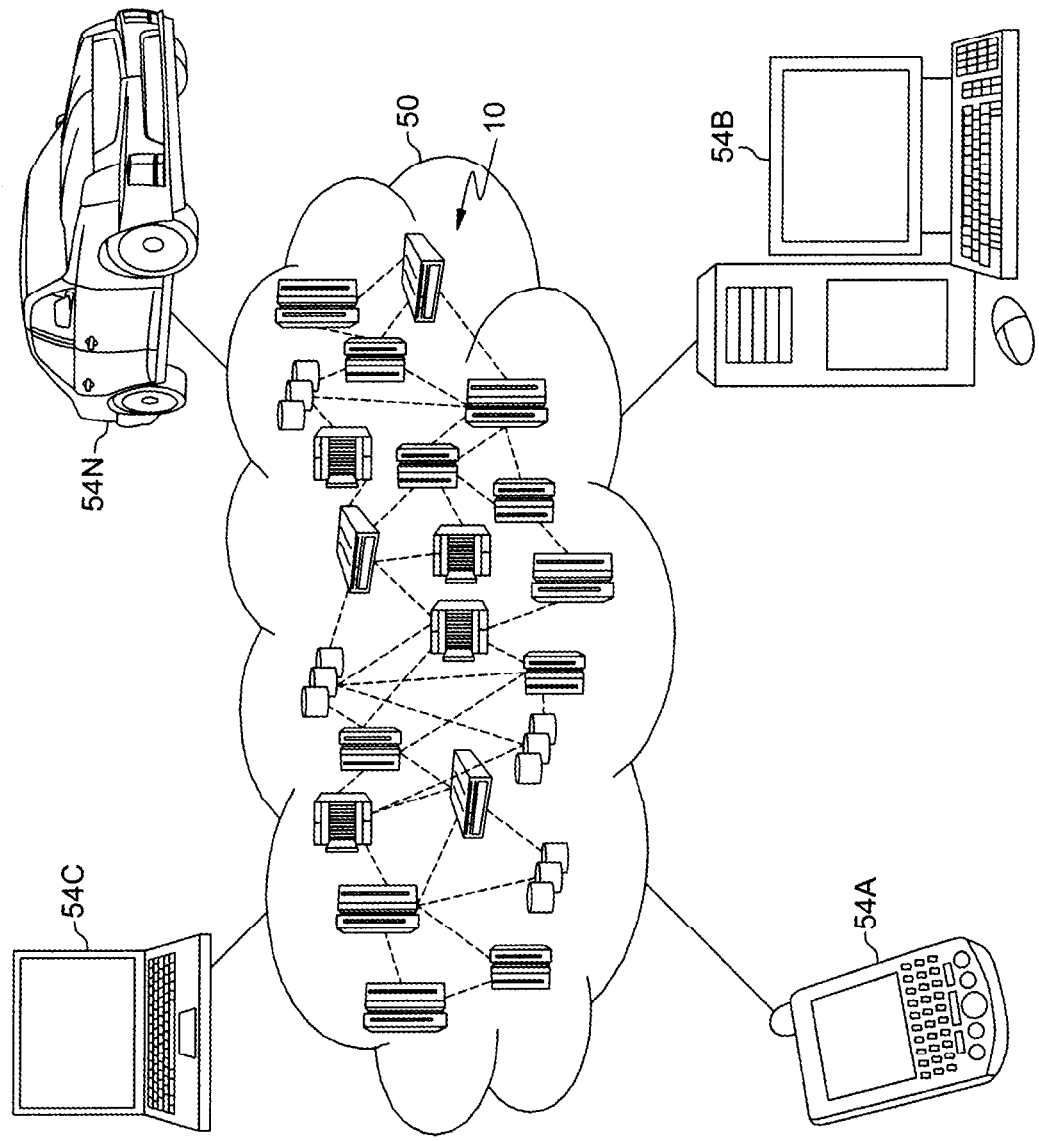
FIG. 5 depicts a cloud computing environment according to embodiments described herein.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
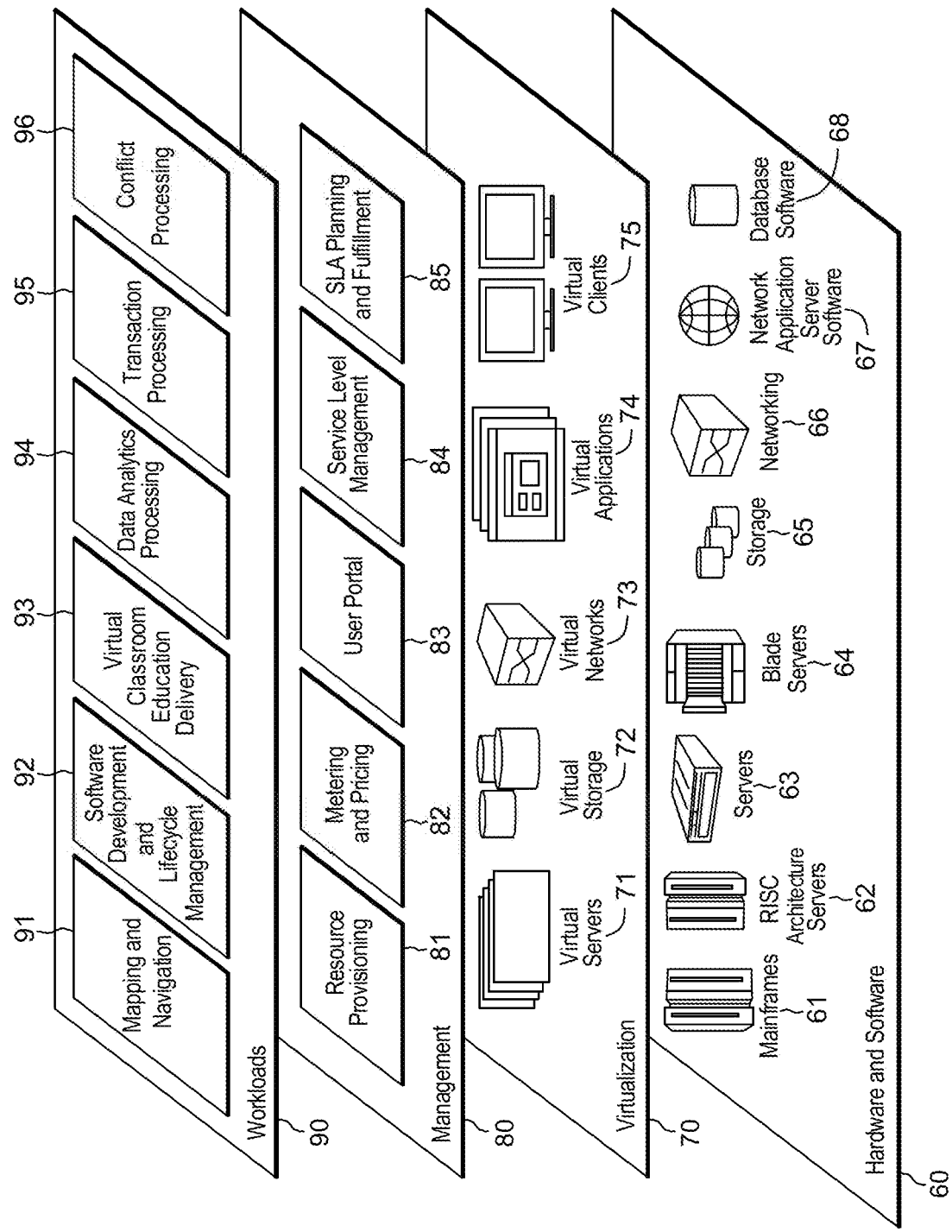
FIG. 6 depicts abstraction model layers according to embodiments described herein.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and conflict processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   obtaining, at a target site, change data from a source site, the change data comprising data stored to a portion of a source database at the source site, the portion of the source database at the source site corresponding to a portion, of a target database at a target site, to which the change data is to be stored, the source database being in a replication relationship with the target database in which a replication facility replicates to a target system at the target site changes made to the source database for application of those changes to the target database;
   installing, with a data replication process at the target site, a call to conflict processing, the call to be invoked based on recognizing conflicts in replication operations;
   identifying, at the target site, a structural change made to the portion of the target database at the target site and, on the basis of the structural change, a mismatch between a length of the obtained change data and an indicated length corresponding to the portion of the target database, at the target site, to which the change data is to be stored, wherein the identifying is based on the target database having been unloaded, the structural change having been performed to the portion of the target database, and the target database having been reloaded;
   recognizing, at the target site, based at least in part on identifying the structural change and on recognizing an inconsistency between a structure of the change data and the structurally-changed portion of the target database, a conflict in a replication operation to be performed at the target site to replicate the change data from the source site to the target site; and
   based on recognizing the conflict in the replication operation, performing conflict processing, at the target site, the conflict processing comprising:
      applying one or more modifications to the change data to comport with the structural change made to the portion of the target database at the target site; and
      storing to the structurally-changed portion of the target database the change data having the one or more modifications applied thereto.

2. The method of claim 1, wherein the structural change comprises a change in a length of the portion of the target database, and wherein the method further comprises signaling a call to the conflict processing based on recognizing the conflict.

3. The method of claim 2, wherein the change in length comprises an increase in length.

4. The method of claim 2, wherein the portion of the target database is one selected from the group consisting of: an Information Management System (IMS) database segment of the target database, and a Virtual Storage Access Method (VSAM) record of the target database.

5. The method of claim 1, wherein the applying the one or more modifications comprises applying custom formatting to the change data to produce a result, and wherein the storing comprises writing the result into the structurally-changed portion of the target database.

6. The method of claim 1, wherein the replication operation is selected from the group consisting of: (i) an insert of the change data, and (ii) an update, using the change data, of current data image data of the portion of the target database.

7. The method of claim 1, further comprising providing an indication of the structural change in metadata about the target database, wherein the identifying the structural change is based further on the provided indication.

8. The method of claim 1, wherein the structural change comprises a change made to the portion of the target database at the target site that changes a structure of the portion of the target database from a first structure to a second structure different from the first structure.

9. The method of claim 1, wherein the target system receives the change data from the source site, and wherein, based on receiving the change data, the target system:
recognizes the conflict in the replication operation that is to be performed at the target site;
invokes the call to the conflict processing; and
performs the conflict processing, including the applying the one or more modifications to the change data and the storing to the structurally-changed portion of the target database.

10. A computer system comprising:
a memory; and
a processor in communication with the memory, wherein the computer system is configured to perform a method comprising:
obtaining, at a target site, change data from a source site, the change data comprising data stored to a portion of a source database at the source site, the portion of the source database at the source site corresponding to a portion, of a target database at a target site, to which the change data is to be stored, the source database being in a replication relationship with the target database in which a replication facility replicates to a target system at the target site changes made to the source database for application of those changes to the target database;
installing, with a data replication process at the target site, a call to conflict processing, the call to be invoked based on recognizing conflicts in replication operations;
identifying, at the target site, a structural change made to the portion of the target database at the target site and, on the basis of the structural change, a mismatch between a length of the obtained change data and an indicated length corresponding to the portion of the target database, at the target site, to which the change data is to be stored, wherein the identifying is based on the target database having been unloaded, the structural change having been performed to the portion of the target database, and the target database having been reloaded;
recognizing, at the target site, based at least in part on identifying the structural change and on recognizing an inconsistency between a structure of the change data and the structurally-changed portion of the target database, a conflict in a replication operation to be performed at the target site to replicate the change data from the source site to the target site; and
based on recognizing the conflict in the replication operation, performing conflict processing at the target site, the conflict processing comprising:
applying one or more modifications to the change data to comport with the structural change made to the portion of the target database at the target site; and
storing to the structurally-changed portion of the target database the change data having the one or more modifications applied thereto.

11. The computer system of claim 10, wherein the structural change comprises a change in a length of the portion of the target database, and wherein the method further comprises signaling a call to the conflict processing based on recognizing the conflict.

12. The computer system of claim 10, wherein the applying the one or more modifications comprises applying custom formatting to the change data to produce a result, and wherein the storing comprises writing the result into the structurally-changed portion of the target database.

13. The computer system of claim 10, wherein the replication operation is selected from the group consisting of: (i) an insert of the change data, and (ii) an update, using the change data, of current data image data of the portion of the target database.

14. A computer program product comprising:
a computer readable storage medium readable by a processing circuit and storing instructions for execution by the processing circuit for performing a method comprising:
obtaining, at a target site, change data from a source site, the change data comprising data stored to a portion of a source database at the source site, the portion of the source database at the source site corresponding to a portion, of a target database at a target site, to which the change data is to be stored, the source database being in a replication relationship with the target database in which a replication facility replicates to a target system at the target site changes made to the source database for application of those changes to the target database;
installing, with a data replication process at the target site, a call to conflict processing, the call to be invoked based on recognizing conflicts in replication operations;
identifying, at the target site, a structural change made to the portion of the target database at the target site and, on the basis of the structural change, a mismatch between a length of the obtained change data and an indicated length corresponding to the portion of the target database, at the target site, to which the change data is to be stored, wherein the identifying is based on the target database having been unloaded, the structural change having been performed to the portion of the target database, and the target database having been reloaded;
recognizing, at the target site, based at least in part on identifying the structural change and on recognizing an inconsistency between a structure of the change data and the structurally-changed portion of the target database, a conflict in a replication operation to be performed at the target site to replicate the change data from the source site to the target site; and based on recognizing the conflict in the replication operation, performing conflict processing, at the target site, at the conflict processing comprising:

applying one or more modifications to the change data to comport with the structural change made to the portion of the target database at the target site; and storing to the structurally-changed portion of the target database the change data having the one or more modifications applied thereto.

15. The computer program product of claim 14, wherein the structural change comprises a change in a length of the portion of the target database, and wherein the method further comprises signaling a call to the conflict processing based on recognizing the conflict.

16. The computer program product of claim 14, wherein the applying the one or more modifications comprises applying custom formatting to the change data to produce a result, and wherein the storing comprises writing the result into the structurally-changed portion of the target database.

17. The computer program product of claim 14, wherein the replication operation is selected from the group consisting of: (i) an insert of the change data, and (ii) an update, using the change data, of current data image data of the portion of the target database.

* * * * *